US007973991B2

(12) United States Patent
Watanabe

(10) Patent No.: US 7,973,991 B2
(45) Date of Patent: Jul. 5, 2011

(54) OSCILLATOR DEVICE, OPTICAL DEFLECTOR AND DRIVING SIGNAL GENERATING METHOD

(75) Inventor: Ikuo Watanabe, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 494 days.

(21) Appl. No.: 12/119,616

(22) Filed: May 13, 2008

(65) Prior Publication Data

US 2008/0285102 A1 Nov. 20, 2008

(30) Foreign Application Priority Data

May 17, 2007 (JP) ................................. 2007-131353

(51) Int. Cl.
*G02B 26/08* (2006.01)
(52) U.S. Cl. .................. 359/224.1; 359/199.1
(58) Field of Classification Search .... 359/199.1–200.8, 359/213.1, 221.2, 223.1, 224.1; 310/36; 318/119, 126, 129; 331/15, 48
See application file for complete search history.

(56) References Cited

U.S. PATENT DOCUMENTS

| 4,317,611 | A | | 3/1982 | Petersen |
| 5,969,465 | A | * | 10/1999 | Neukermans et al. ........ 310/333 |
| 6,775,039 | B2 | | 8/2004 | Sakai |
| 6,975,442 | B2 | * | 12/2005 | Gessner et al. ............ 359/224.1 |
| 7,088,492 | B2 | | 8/2006 | Yanagita et al. |
| 7,271,943 | B2 | | 9/2007 | Yasuda et al. |
| 7,362,494 | B2 | * | 4/2008 | Huibers et al. ............... 359/291 |
| 7,460,803 | B2 | * | 12/2008 | Ichimura et al. ............... 399/48 |

FOREIGN PATENT DOCUMENTS

| JP | 57-8520 | 1/1982 |
| JP | 7-175636 | 7/1995 |
| JP | 2003-43402 | 2/2003 |
| JP | 2003-185949 | 7/2003 |
| JP | 2005-208578 | 8/2005 |

OTHER PUBLICATIONS

Notification of First Office Action—Application No. 200810099085.8, Chinese Patent Office, Oct. 16, 2009 (w/English-language translation).

* cited by examiner

*Primary Examiner* — Frank G Font
(74) *Attorney, Agent, or Firm* — Fitzpatrick, Cella, Harper & Scinto

(57) ABSTRACT

An oscillator device includes an oscillation system 115 having a plurality of oscillators and a plurality of torsion springs, a supporting member for supporting the oscillation system 115, driving members 114 and 1152, a signal output device 121 and 122, and a drive control unit 101-113, 123 and 124, wherein the driving member drives the oscillation system 115 so that the oscillator provides oscillation presented by an equation including the sum of a plurality of periodic functions, wherein the signal output device produces a signal corresponding to the displacement of the oscillator, and wherein the drive control unit controls the driving member based on an output signal of the signal output device and by use of a driving signal which is expressed by an equation including the sum of a plurality of periodic functions, the drive control unit including a driving signal generation circuit 109 for generating a driving signal using a trigonometric function table 110.

9 Claims, 8 Drawing Sheets

FIG.2
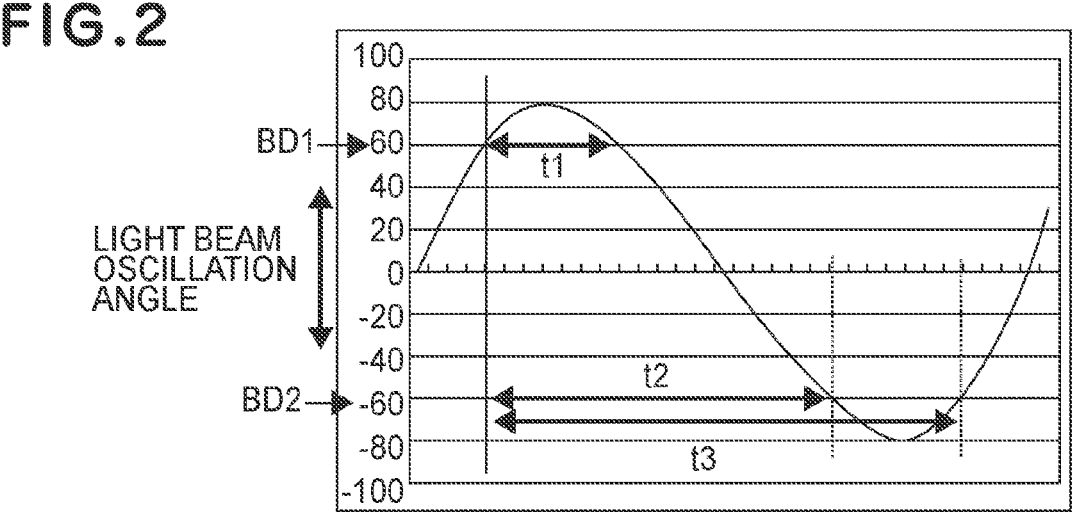
FIG.3A
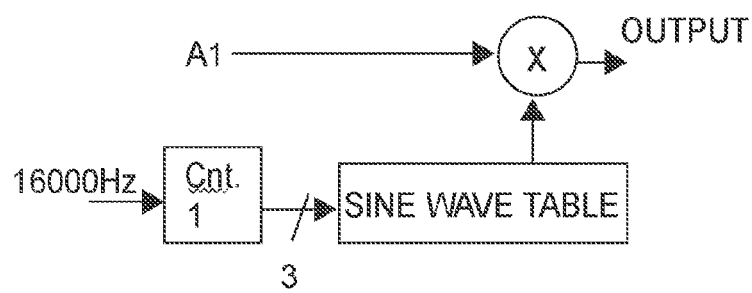
FIG.3B
| ADDRESS | 0 | 1 | 2 | 3 | 4 | 5 | 6 | 7 |
|---|---|---|---|---|---|---|---|---|
| DATA | 0 | $\frac{\sqrt{2}}{2}$ | 1 | $\frac{\sqrt{2}}{2}$ | 0 | $\frac{-\sqrt{2}}{2}$ | -1 | $\frac{-\sqrt{2}}{2}$ |
INITIAL PHASE OF FUNDAMENTAL WAVE (arrow to address 0)

FIG.4A
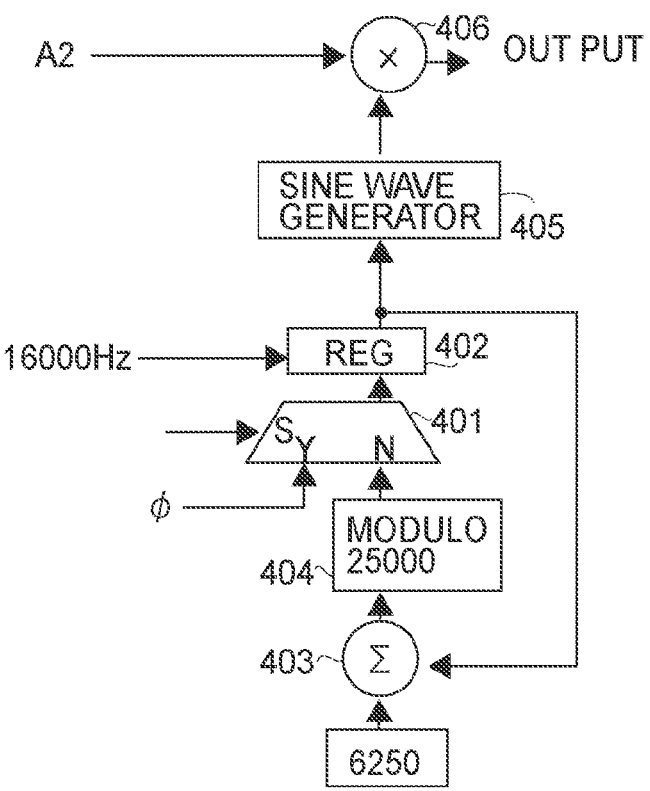
FIG.4B
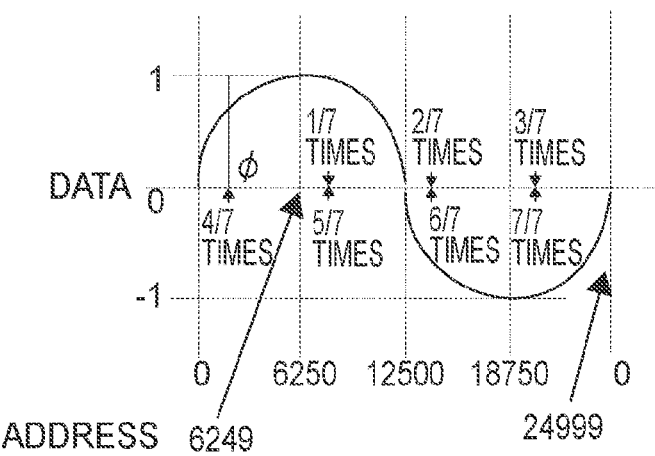
FIG.4C
| 0 | 1 | 2 | 3 | 24998 | 24999 |
|---|---|---|---|---|---|
| 0.0 | 2.5133E-4 | 5.0265E-4 | 1.3160E-5 | -5.0265E-4 | -2.5133E-4 |

OSCILLATOR DEVICE, OPTICAL DEFLECTOR AND DRIVING SIGNAL GENERATING METHOD

FIELD OF THE INVENTION AND RELATED ART

This invention relates generally to the technical field of oscillator devices having an oscillator such as a microoscillation structure, for example. More particularly, the invention concerns an oscillator device having a specific feature with regard to generation of a driving signal for driving the oscillator, an optical deflecting device using such oscillator device, and a driving signal generating method for generating a driving signal in an oscillator device. Optical deflecting devices using such an oscillator device are applicable to projectors or visual display units such as a scanning display unit, for example, printers such as a laser beam printer (LBP), or image forming apparatuses such as a digital copying machine.

Conventionally proposed resonance type optical deflecting devices in which a mirror is resonance-driven are characterized by the following features, as compared with optical scanning optical systems using a rotary polygonal mirror such as polygon mirror, for example. That is: the size of the optical deflecting device can be made very small; the power consumption is low; and theoretically there is no surface tilt. Particularly, optical deflecting devices comprised of Si monocrystal and produced by semiconductor processes have advantages that theoretically there is no metal fatigue and that the durability is very good (see Patent Document No. 1, listed below).

On the other hand, in the resonance type deflectors, since the deflection angle (displacement angle) of the mirror theoretically changes sinusoidally, the angular speed is not constant. In order to correct this characteristic, Patent Document No. 2 (listed below) has proposed a microoscillator having a plurality of natural oscillation modes in which a system comprised of a plurality of torsion springs and a system comprised of a plurality of movable elements are made separate. In this microoscillator, the separated natural oscillation modes include a reference oscillation mode which is a natural oscillation mode of a reference frequency and an even-integer-fold oscillation mode which is a natural oscillation mode of a frequency approximately n-fold the reference frequency where n is an even number. In Patent Document No. 2, by oscillating the microoscillator in accordance with these oscillation modes, sawtooth-wave driving and the like are accomplished. Furthermore, a digital driving-circuit example is also disclosed there.

[Patent Documents]
1. Japanese Patent Laid-Open No. 57-8520
2. Japanese Laid-Open Patent Application No. 2005-208578

SUMMARY OF THE INVENTION

The drive control of the oscillator device described above should be improved further, and the present invention provides an oscillator device and a driving signal generating method by which a driving signal can be produced based on a trigonometric function table.

In accordance with an aspect of the present invention, there is provided an oscillator device with a plurality of oscillators and a plurality of torsion springs, comprising: an oscillation system having a first oscillator, a second oscillator, a first torsion spring configured to connect said first and second oscillators to each other, and a second torsion spring connected to said second oscillator and having a torsion axis consistent with a torsion axis of said first torsion spring; a supporting member configured to support said oscillation system; a driving member configured to drive said oscillation system so that at least one of said first and second oscillators produces oscillation being expressed by an equation containing a sum of a plurality of periodic functions; a signal output device configured to produce an output signal in accordance with displacement of at least one of said first and second oscillators; and a drive control unit configured to control said driving member based on the output signal of said signal output device and by use of a driving signal so that at least one of an amplitude and a phase of the plurality of periodic functions acquires a predetermined value; wherein the driving signal is expressed by an equation containing a sum of a plurality of periodic functions corresponding to the first-mentioned plurality of periodic functions, respectively, and wherein said drive control unit includes a driving signal generating circuit configured to generate the driving signal based on a trigonometric function table.

In one preferred form of this aspect of the present invention, when $A_1$ and $A_2$ each denotes an amplitude, $\o$ denotes a relative phase difference, $\omega$ denotes an angular frequency and t denotes time, said drive control unit controls said driving member to drive said oscillation system so that displacement of at least one of said first and second oscillators provides oscillation being expressed by an equation which contains at least a term of $A_1 \sin \omega t + A_2 \sin(n\omega t + \o)$ where n is an integer not less than 2.

The oscillation system may be configured to simultaneously produce a first vibrational motion moving with a first frequency which is a fundamental frequency and a second vibrational motion moving with a second frequency which is a frequency integer-fold the fundamental frequency, wherein said driving member is configured to apply a first periodic driving force having the first frequency and a second periodic driving force having the second frequency, wherein the output signal of said signal output device contains first and second, different time entries whereat at least one of said first and second oscillators takes a first displacement angle and third and fourth, different time entries whereat said at least one oscillator takes a second displacement angle, and wherein said drive control unit controls said driving member based on the four, first to fourth time entries thereby to control oscillation of at least one of said first and second oscillators defined by an amplitude and a relative phase difference of said first and second vibrational motions.

The driving signal generating circuit of said drive control unit may be configured to generate the driving signal by use of a trigonometric function table having a range of 45 degrees and a differentiation circuit.

The driving signal generating circuit of said drive control unit may be configured to generate the driving signal by use of a trigonometric function table having an increment precision corresponding to 1/n of a required angular resolution where n is an integer, and an interpolation circuit.

The driving signal generating circuit of said drive control unit may be configured to generate the driving signal by use of a pulse width modulation driving circuit.

In accordance with another aspect of the present invention, there is provided an optical deflector, comprising: a light source configured to emit a light beam; and an oscillator device as recited above and having a reflection mirror formed on at least one of said first and second oscillators.

In accordance with a further aspect of the present invention, there is provide an image forming apparatus, comprising: an optical deflector as recited above; and a photosensitive member; wherein said optical deflector is configured to deflect light from said light source and to direct at least a portion of the light onto said photosensitive member.

In accordance with a yet further aspect of the present invention, there is provided a visual display apparatus, comprising: an optical deflector as recited above; and a visual display member; wherein said optical deflector is configured to deflect light from said light source and to direct at least a portion of the light onto said visual display member.

In accordance with a still further aspect of the present invention, there is provided a driving signal generating method for generating a driving signal in an oscillator device having an oscillation system including a plurality of oscillators and a plurality of torsion springs, a driving member configured to drive the oscillation system and a drive control unit configured to control the driving member based on a driving signal, the improvements comprising: the driving signal being expressed by an equation containing a sum of a plurality of periodic functions; and the driving signal being generated by use of a trigonometric function table.

In one preferred form of this aspect of the present invention, the trigonometric function table is a trigonometric function table having a range of 45 degrees, wherein the driving signal is generated by use of the trigonometric function table and a differentiation circuit.

In accordance with the present invention, by using a trigonometric function table, a driving signal presented by an equation including the sum of a plurality of periodic functions can be generated and, based on this, an oscillation system which oscillates in a mode having two resonance frequency components, for example, can be controlled to provide a desired operation.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 2 is a diagram which shows a beam detector and timing in a working example of the present invention.

FIG. 3A is a diagram illustrating a structural example of a fundamental wave generating circuit in working example 1.

FIG. 3B is a diagram illustrating a sinusoidal wave table of it.

FIG. 4A is a diagram illustrating a structural example of a second harmonic generating circuit of working example 1.

FIG. 4B is a diagram illustrating a sinusoidal wave table of it.

FIG. 4C is a diagram illustrating a sinusoidal wave table for use in the second harmonic generating circuit 110.

DESCRIPTION OF THE PREFERRED EMBODIMENTS

Preferred embodiments of the present invention will now be described with reference to the attached drawings.

First of all, common structural features in an embodiment wherein an oscillator device and a driving signal generating method of the present invention are applied to an optical deflecting device and in some working examples to be described later, will now be explained with reference to FIGS. 9A and 9B.

Figure 9A:
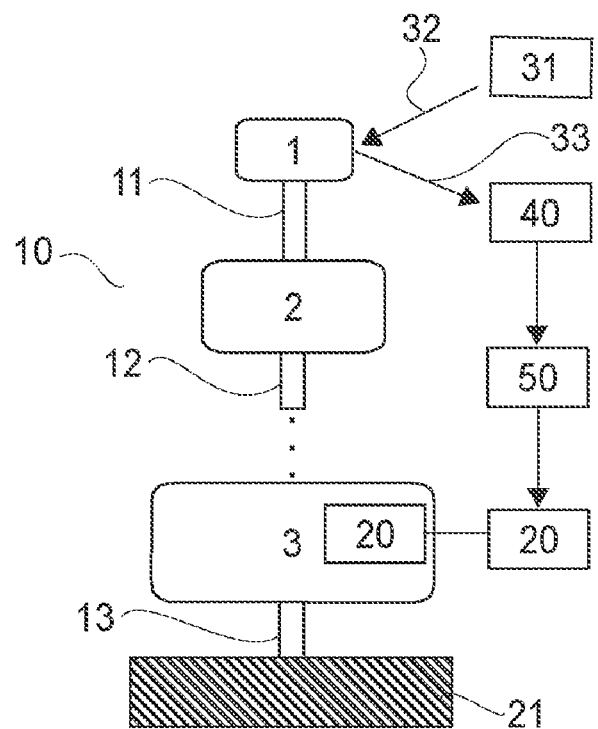
FIGS. 9A and 9B are diagrams for explaining an embodiment of the present invention.
Figure 9B:
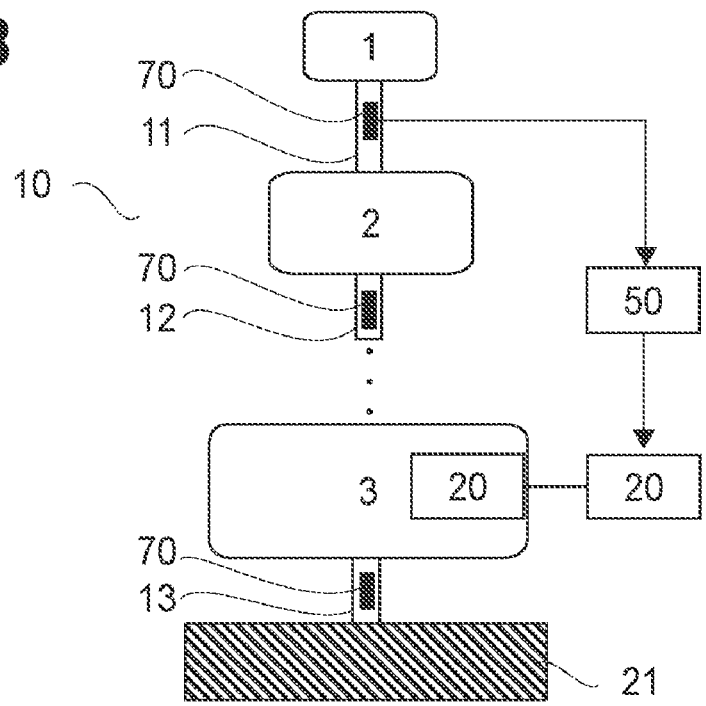

As shown in FIGS. 9A and 9B, the oscillator device is comprised of an oscillation system 10 having at least a first oscillator 1, a second oscillator 2, a first torsion spring 11 and a second torsion spring 12, as well as a supporting member 21 for supporting the oscillation system. The first torsion spring connects the first oscillator and the second oscillator each other. The second torsion spring is connected to the second oscillator and it has a torsional axis consistent with that of the first torsion spring. The oscillation system should have at least two oscillators and two torsion springs. Thus, as shown in FIGS. 9A and 9B, the oscillation system 10 may be comprised of three or more oscillators 1, 2 and 3 and three or more torsion springs 11, 12 and 13.

The oscillator device further comprises a driving member 20 for applying a driving force to the oscillation system and a drive control unit 50 for controlling the driving member 20. The driving member 20 drives the oscillation system so that at least one of the plurality of oscillators provides oscillation as can be presented by an equation including the sum of a plurality of periodic functions. The drive control unit 50 supplies a driving signal to the driving member 20, causing the oscillation system to produce such oscillation.

When the oscillator device is used as an optical deflecting device, a reflecting mirror may be formed on at least one oscillator. As regards such reflecting mirror, a light reflecting film may be formed on the surface of the oscillator. If the surface of the oscillator is sufficiently smooth, it can be used as the reflecting mirror without provision of a light reflecting film.

The optical deflecting device may further comprise a light source 31 for emitting a light beam. It projects a light beam 32 to the reflecting mirror provided on the oscillator, and the reflected light 33 is scanningly deflected.

Now, the principle of operation of the oscillator device will be explained.

Generally, the equation of free oscillation of an oscillation system including oscillators of a number n and torsion springs of a number n is given by a formula (I) below.

$$M\ddot{\theta} + K\theta = 0 \tag{1}$$

$$\theta = \begin{pmatrix} \theta_1 \\ \theta_2 \\ \vdots \\ \theta_M \end{pmatrix}, M = \begin{pmatrix} I_1 & & & \\ & I_2 & & \\ & & \ddots & \\ & & & I_M \end{pmatrix},$$

$$K = \begin{pmatrix} k_1 & -k_1 & & \\ -k_1 & k_1+k_2 & -k_2 & \\ & & \ddots & \\ & & -k_{n-1} & k_{n-1}+k_n \end{pmatrix}$$

wherein $I_k$ is the inertial moment of the oscillator, $k_k$ is the spring constant of the torsion spring, and $\theta_k$ is the torsion angle (displacement angle) of the oscillator (k=1, ..., n). If the eigen value of $M^{-1}K$ of this system is $\lambda_k$ (k=1, ..., n), the angular frequency $\omega_k$ of the natural oscillation mode is given by $\omega_k=\sqrt{(\lambda_k)}$.

The oscillation system can produce various motions to the oscillator if the oscillation system having oscillation modes of a number n and including oscillators of a number n and torsion springs of a number n is arranged so that a fundamental frequency and frequencies integer-fold the fundamental frequency, of a number n−1, are included in these $\omega_k$. Here, it should be noted that in this specification the word "integer-fold" includes a case of approximately integer-fold, and this approximately integer-fold may be in the numerical range from 0.98n-fold to 1.02n-fold the fundamental frequency (n is an arbitrary integral number). Particularly, if the oscillator device is comprised of two oscillators and two torsion springs and it is arranged so that a fundamental frequency and a frequency of approximately even-number-fold the fundamental frequency are included in $\omega_k$, approximately constant angular-speed driving can be accomplished in a predetermined range while drift of the angular speed of the oscillator is well suppressed.

Furthermore, in case of n=3, an oscillation system having oscillators 1, 2 and 3 and torsion springs 11, 12 and 13 may be arranged so as to provide a frequency ratio of 1:2:3 for the three oscillation modes. By exciting the oscillation system simultaneously with these oscillation modes 1, 2 and 3 which this oscillation system bears, it produces a drive with smaller drift of angular speed, as compared with a case where n=2. For example, this oscillation system may be driven with a frequency ratio of the oscillation modes of 1:2:3 and an amplitude ratio of the oscillation modes of 24:−6:1.

By increasing the number of oscillation modes as described above, the drift of angular speed of the oscillator in a predetermined range can be reduced.

Furthermore, the oscillator can be driven in accordance with approximately chopping waves if the oscillator device is comprised of two oscillators and two torsion springs and it is so arranged that a fundamental frequency and a frequency approximately threefold the fundamental frequency are included in $\omega_k$.

Now, the oscillation of an oscillation system in an embodiment wherein the oscillation system is comprised of oscillators of a number n and torsion springs of a number n, as shown in FIGS. 9A and 9B, will be explained.

This oscillation system is arranged to simultaneously produce a vibrational motion moving with a fundamental frequency and a vibrational motion moving with frequencies of a number n−1 and being approximately integer-fold the fundamental frequency. Hence, in one embodiment of the present invention, at least one of a plurality of oscillators may be arranged to provide an oscillation that can be presented by an equation including the sum of a plurality of periodic functions. The equation containing the sum of a plurality of periodic functions may include an equation containing a constant term, as well. For example, a case including the constant term may be a case where a certain DC bias is applied to the driving member to shift the origin of the displacement angle (the position of zero displacement angle) of the oscillator.

Furthermore, in another embodiment of the present invention, the deflection angle $\theta$ of the optical deflecting device (here, it may be measured with reference to the position of the scan center) may be as follows. If the amplitude of the first vibrational motion and the angular frequency thereof are denoted by $A_1$ and $\omega$, respectively, the amplitude of the second vibrational motion and the angular frequency thereof are denoted by $A_2$ and n$\omega$ (n is an integer not less than 2), and the relative phase difference of the first and second vibrational motions is denoted by ø, then the motion of the oscillator provides oscillation as can be presented by an arithmetic expression which contains at least a term of $A_1 \sin \omega t + A_2 \sin(n\omega t + ø)$. Particularly, in case of n=2, it is expressed by a formula including at least a term of $A_1 \sin \omega t + A_2 \sin(2\omega t + ø)$. Thus, approximately constant angular-speed driving can be realized in a predetermined range, suppressing the drift of angular speed of the oscillator. Furthermore, in case of n=3, it is expressed by a formula including at least a term of $A_1 \sin \omega t + A_2 \sin(3\omega t + ø)$, and approximately chopping wave drive of the oscillator can be realized. It should be noted that, in this case as well, the equation containing at least a term of $A_1 \sin \omega t + A_2 \sin(n\omega t + ø)$ may include an equation containing a constant term.

Furthermore, the present invention can be embodied as follows. Namely, the motion of the oscillator may be expressed by an equation $\theta(t) = A_1 \sin \omega t + \Sigma A_n \sin(n\omega t + ø_{n-1})$, wherein the amplitude of the first vibrational motion and the angular frequency thereof are denoted by $A_1$ and $\omega$, respectively, and the amplitude of the n-th vibrational motion and the angular frequency thereof are denoted by $A_n$ and n$\omega$, respectively. Also, the relative phase difference of the first vibrational motion and the n-th vibrational motion is denoted by $ø_{n-1}$. Furthermore, n is an integer number not less than 2. With regard to the value of n, the number of oscillators constituting the oscillator device may be made as large as possible.

With regard to the driving member 20, it may comprise an electromagnetic system, an electrostatic system or a piezoelectric system, for example, to apply a driving force to the oscillation system. In case of electromagnetic driving, for example, a permanent magnet may be provided on at least one oscillator and an electric coil for applying a magnetic field to this permanent magnet may be disposed adjacent the oscillator. Alternatively, the permanent magnet and the electric coil may be disposed reversely. In case of electrostatic driving, an electrode may be formed on at least one oscillator and an electrode for providing an electrostatic force between it and this electrode may be formed adjacent the oscillator. In case of piezoelectric driving, a piezoelectric element may be provided on the oscillation system or the supporting member, and a driving force is applied thereby.

Furthermore, the drive control unit 50 may be configured to produce a driving signal which causes a vibrational motion of the oscillation system as described above, and it may apply such driving signal to the driving member 20.

For example, the driving signal may be a driving signal directly using such a signal which is based on synthesizing a sinusoidal wave in accordance with a trigonometric function table. Alternatively, it may be a pulse-like driving signal generated from a signal based on synthesizing a sinusoidal wave in accordance with a trigonometric function table. In the case of a driving signal based on synthesizing a sinusoidal wave, a desired driving signal can be obtained by adjusting the phase and amplitude of individual sinusoidal waves. Furthermore, if the oscillator is driven based on a pulse-like signal, then the number, spacing and/or width of the pulses may be changed with respect to time, in accordance with a signal based on synthesizing a sinusoidal wave. Base on this, a desired driving signal can be generated (see working example 4 to be described later).

Furthermore, the oscillator device may comprise a signal output device for outputting a signal in accordance with the displacement of at least one oscillator of a plurality of oscillators. In FIG. 9A, this signal output device is a light receiving element 40, and in FIG. 9B, the signal output device is a piezoresistor 70. Such a signal output device can be used as a displacement angle measuring instrument. Thus, in this specification, the signal output device and the displacement angle measuring instrument are referred to with an equal meaning.

In order to detect the displacement angle of the oscillator with use of a piezoresistor 70, the piezoresistor 70 may be provided at a torsion spring, for example, and based on a signal output from this piezoresistor 70 the time moment whereat the oscillator takes a certain displacement angle may be detected. The piezoresistor 70 may be made, for example, by scattering phosphor in p-type monocrystal silicon. The piezoresistor 70 is able to produce a signal corresponding to the torsion angle of the torsion spring. Thus, in order to measure the displacement angle of the oscillator, a plurality of torsion springs may be provided with such piezoresistors 70, respectively, and the displacement angle of the oscillator may be detected based on information of the torsion angles of the plurality of torsion springs. This assures high-precision measurement.

Furthermore, in order to detect the displacement angle of the oscillator with use of a light receiving element 40, the device may be arranged as follows. A first light receiving element may be disposed at the position irradiated by the scanning light when the oscillator takes the first displacement angle, and a second light receiving element may be disposed at the position irradiated by the scanning light when the oscillator takes the second displacement angle. The first and second light receiving elements may be comprised of different elements, or they may be the same element. Furthermore, the scanning light may be directly incident on the light receiving element or, alternatively, by way of at least one reflection member, reflection light may be incident on the light receiving element. In short, what is required here is that at least one light receiving element is disposed to receive and detect the scanning light at the first and second scan angles.

The signal output device may be one which is configured to produce an output when a predetermined displacement angle is provided intermittently with respect to a time base, or it may be one configured to produce a signal continuously with respect to a time base, in accordance with the displacement. It should be noted here that in this specification, since the deflection angle of the mirror and the scan angle of the scanning light being scanningly deflected by the mirror are in a fixed relationship and they can be treated equally.

The driving signal generating method according to the embodiments described above can be summarized as follows. In an oscillator device comprising an oscillation system including a plurality of oscillators and a plurality of torsion springs, a driving member for driving the oscillation system, and a drive control unit for controlling the driving member by use of a driving signal, the driving signal is expressed by an equation containing the sum of a plurality of periodic functions and the driving signal is generated with use of a trigonometric function table.

According to the embodiments described above, a driving signal presented by an equation containing the sum of a plurality of periodic functions can be generated with use of a trigonometric function table. With this arrangement, feedback control can be done with respect to a desired operation of the oscillation system, moving in a mode including a plurality of resonance frequency components.

Next, several working examples of the embodiments of the present invention described hereinbefore will be explained.

Working Example 1

Figure 1:
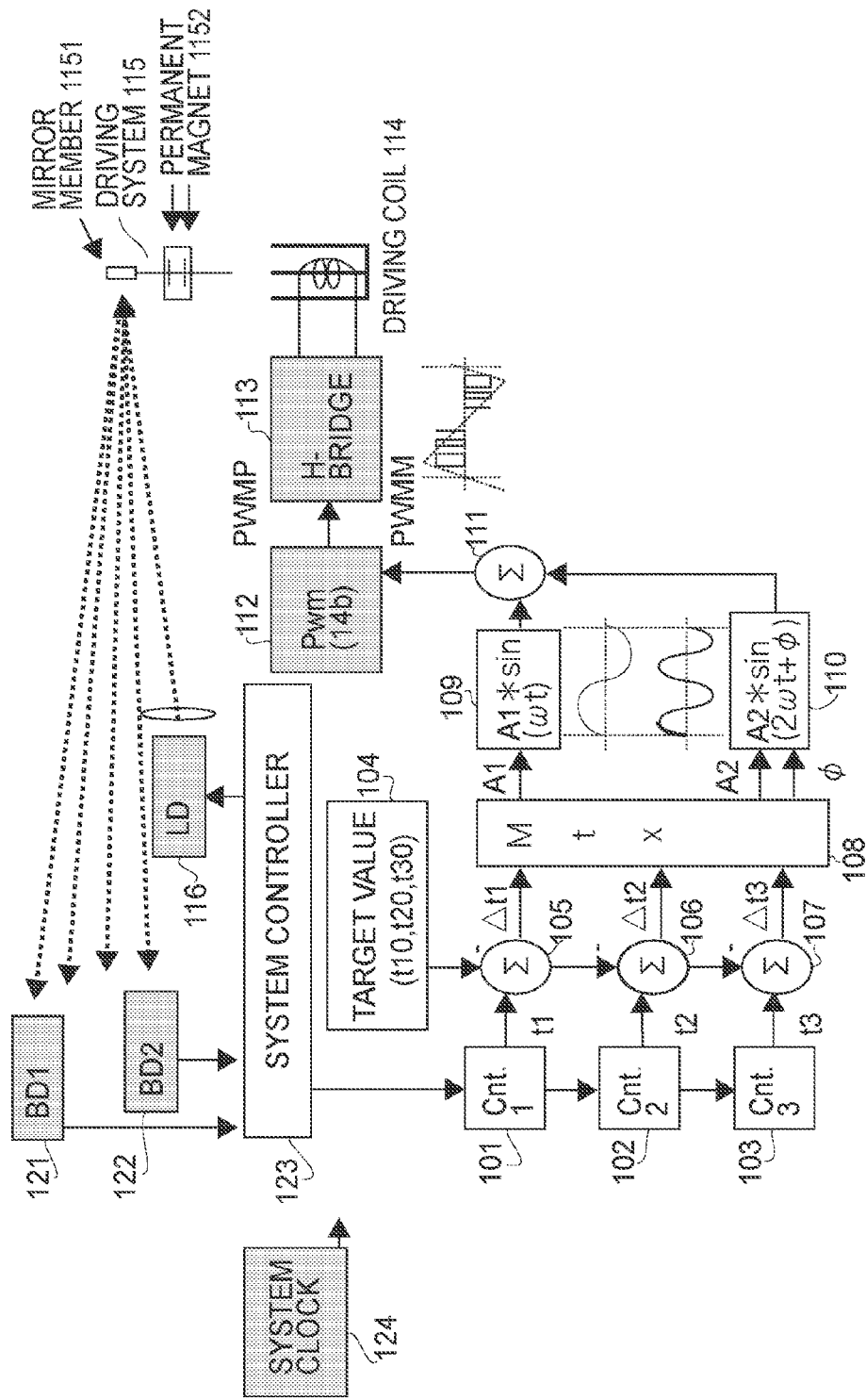
FIG. 1 is a block diagram of an optical deflecting device according to a working example of the present invention.

Working example 1 which is a specified form of an embodiment of the present invention will be explained below. This working example relates to an optical deflecting device including an oscillation system 115. FIG. 1 is a block diagram of this working example, and it illustrates details of a driving circuit of a driving member and a drive control unit of the optical deflecting device. In FIG. 1, the portion including a mirror member 1151 corresponds to the portion of the oscillation system 10 of FIG. 9. More specifically, the oscillator having a mirror member 1151 corresponds to the oscillator 1 of FIG. 9, and the oscillator having a permanent magnet 1152 corresponds to the oscillator 2 of FIG. 9. LD (laser diode) 116 corresponds to the light source 31 of FIG. 9, and a beam detector (BD1 and BD2) 121 and 122 portions to the light receiving element 40 of the signal output device of FIG. 9 or to the piezoresistor 70. Furthermore, the portion of a driving coil 114 and a permanent magnet 1152 corresponds to the driving member 20 of FIG. 9. The remaining portion corresponds to the drive control unit 50 of FIG. 9.

In this embodiment, the oscillation system 115 is driven by the driving member including a driving coil 114 and a permanent magnet 1152, so that the oscillator having a mirror member 1152 provides oscillation as can be presented by an equation containing the sum of a plurality of periodic functions. The beam detector (BD1 and BD2) 121 and 122 which is signal output device produces an output in accordance with the displacement of the oscillator of the mirror member 1151. The drive control unit including component 101-113, 123 and 124 supplies a driving signal to the driving coil 114 so that the amplitude and phase of the plurality of periodic functions acquire a predetermined value. The driving signal is presented by an equation containing the sum of a plurality of periodic functions corresponding to the aforesaid plurality of periodic functions, and the drive control unit includes a driving signal generating circuit 109 and 110 for generating this driving signal with use of a trigonometric function table.

More specifically, when $A_1$ and $A_2$ each denotes an amplitude, ø denotes a relative phase difference, ω denotes an angular frequency and t denotes time, the drive control unit is configured so that the displacement of the oscillator of the mirror member 1151 provides oscillation which can be expressed by an equation containing a term, where n is an integer not less than 2. In this working example, the driving member drives the oscillation system so that it produces oscillation as can be expressed by $A_1 \sin \omega t + A_2 \sin(2\omega t + ø)$.

Furthermore, in working example, the oscillation system including the oscillator of the mirror member 1151 is configured to simultaneously produce a first vibrational motion moving with a first frequency which is a fundamental frequency and a second vibrational motion moving with a second frequency which is a frequency n-fold the fundamental frequency where n in an integer. Furthermore, the driving member of the driving coil 114 and the permanent magnet 1152 is able to apply a first periodic driving force having the first frequency and a second periodic driving having the second frequency. The output signal of the signal output device of the beam detector 121 and 122 contains first and second, different time entries (time information) whereat the oscillator of the mirror member 1152 takes a first displacement angle, and third and fourth, different time entries whereat it takes a second displacement angle. The drive control unit controls the driving member based on the four, first to fourth time entries thereby to control oscillation of the oscillator of the mirror member 1152 as defined by the amplitude and relative phase difference of the first and second vibrational motions.

This will be explained in greater detail, with reference to FIG. 1.

Here, the angular frequency (first frequency) $\omega 1$ of the fundamental wave is assumed as $\omega 1 = 2\pi \cdot 2000$ Hz, and the angular frequency (second frequency) $\omega 2$ of the second harmonic is assumed as $\omega 2 = 2\pi \cdot 4000$ Hz. Furthermore, it is assumed that the system controller 123 and the like are working with a clock 100 MHz from a system clock 124.

In response to a command from the system controller 123, LD 116 emits light. The light beam therefrom is reflected by the mirror member 1151 of the oscillation system 115, and it is incident on the first beam detector (BD1) 121 the second beam detector (BD2) 122 which are disposed outside the opposite ends of the image drawing region. These positions outside the opposite ends of the image drawing region correspond to the positions where the light beam is incident when the oscillator of the mirror member 1152 takes the first displacement angle and the second displacement angle, respectively.

In accordance with the deflection angle (displacement angle) of the oscillation system 115, there is a relationship between the time and the position of the light beam as depicted in FIG. 2. In FIG. 2, the timing whereat, after being incident on the second beam detector 122, light is incident on the first beam detector 121 is taken as a reference (the aforementioned first time entry). Then, the time form that time moment to the time moment (the aforementioned second time entry) whereat the light is subsequently incident on the first beam detector 121 is taken as t1. Furthermore, the time till the time moment (the aforementioned third time entry) whereat the light is incident on the second beam detector 122 is taken as t2, and the time till the time moment (the aforementioned fourth time entry) whereat the light is incident once more on the second beam detector 122 is taken as t3.

At the moment whereat, after the light is incident on the second beam detector 122, the light is initially incident on the first beam detector 121, the system controller 123 start counting at 100 MHz by use of three counters (CNT1, CNT2 and CNT3) 101, 102 and 103. When the light is subsequently incident on the first beam detector 121, the system controller 123 stops the counter (CNT1) 101. When the light is incident on the second beam detector 122 afterwards, the controller stops the counter (CNT2) 102. When the light is incident on the second beam detector 122 once again, the controller stops the counter (CNT3) 103. With these procedures, times t1, t2 and t3 are obtained. By subtracting target values (t10, t20 and t30) 104 from these values by use of adder 105, 106 and 107 respectively, target value errors $\Delta t1$, $\Delta t2$ and $\Delta t3$ are obtained.

By calculating these target value errors by use of a matrix operation circuit (Mtx) 108, the amplitude information A1 of the fundamental wave, amplitude information A2 of the second harmonic, and the phase ø of the harmonic relative to the fundamental wave are obtained. The computing equation with the matrix operation circuit (Mtx) 108 has been set beforehand and stored. These value A1, A2 and ø are inputted into a fundamental wave generating circuit (A1*sin(ωt)) 109 and a second harmonic generating circuit (A2*sin(2ωt+ø)) 110. The periodic functions of two frequencies from these generating circuits are synthesized each other by an adder 111, and the resultant signal is applied to a PWM (pulse width modulation) driving circuit 112. The output of the PWM driving circuit 112 is applied to an H-bridge circuit (H-bridge) 113, whereby an electric current is supplied to the driving coil 114. In this manner, the permanent magnet 1152 is driven (more specifically, a torque is applied thereto) by a magnetic field produced at the driving coil 114, and drive control of the mirror member 1151 of the oscillation system 115 is carried out.

Generation of the driving signal described above is feedback-controlled, and the oscillation system 115 is driven based on the driving signal having targets A1, A2 and ø. With regard to the fundamental wave generating circuit 109 and the second harmonic generating circuit 110, details of the structure of operation will be explained later in greater detail.

It should be noted that the following structure may be employed. Namely, without using a PWM driving circuit 112 and an H-bridge circuit, an appropriate circuit including a DAC (digital analog converter) and an amplifier may be used, and the driving coil 114 may be driven by an analogous driving signal of sinusoidal wave shape based on a composite signal from the adder 111.

Next, the fundamental wave generating circuit 109 and the second harmonic generating circuit 110 of this working example will be explained.

The circuit shown in FIG. 3A which is a structural example of the fundamental wave generating circuit 109 produces a fundamental wave of 2000 Hz which is then multiplied by a coefficient of A1. On the other hand, the circuit shown in FIG. 4A which is a structural example of the second harmonic generating circuit 110 produces a second harmonic of 4000 Hz having an arbitrary phase ø relative to the fundamental wave, which is then multiplied by a coefficient of A2.

According to the sampling theorem, if the waveform is produced based on the sampling at a frequency twofold the frequency 4000 Hz, a second harmonic of arbitrary phase can be generated without a problem. However, this applies only if the same condition lasts from the past to the future with respect to the time base. Actually, it would be necessary to generate a waveform with a frequency around further doubling the same. Hence, in this example, the waveform generation is performed at a sampling frequency of 16000 Hz.

FIG. 3A shows a structural example of the fundamental wave generating circuit 109. This fundamental wave generating circuit 109 is synchronized to the system clock 124 of 100 MHz, and it operates with a clock 16000 Hz (corresponding to 6250 clocks if counted at 100 MHz). The fundamental wave of 2000 Hz can be generated only by the data of eight points (8=16000/2000), and the phase thereof may be fixed. Hence, the sinusoidal wave table which is a trigonometric function table has a simple eight-bit address such as shown in FIG. 3B and, with regard to the values, there are only five types of values of 0, $\pm\sqrt{2}/2$ and $\pm 1$. In the fundamental wave generating circuit 109, at last, a wave generated by referring to the sinusoidal wave table is multiplied by A1, and an output is produced.

The second harmonic generating circuit 110 as well of this working example shown in FIG. 4A is synchronized to the system clock 124 of 100 MHz, and it operates at a clock of 16000 Hz. If the phase can be fixed, it would be simple.

However, since there should be an arbitrary phase difference ø relative to the fundamental wave, a comparatively large sinusoidal wave table is necessary. For example, if 4000 Hz should be phase-controlled with a system clock precision of 100 MHz, the phase ø relative to the fundamental wave has 25000 varieties (=100000000/4000). Therefore, the sinusoidal wave table of the sinusoidal wave generator 405 of FIG. 4A would be one such as shown in FIG. 4B wherein 360 degrees are divided into 25000 increments, and addresses and data from 0 to 24999 are provided (actually, it is a table such as shown in FIG. 4C rather than a graph).

The operation of the second harmonic generating circuit 110 will now be explained. First of all, in the second harmonic generating circuit of FIG. 4A, the selector 401 selects the value of aforementioned ø (one from 0 to 24999), at the timing before the initial phase of the fundamental wave generating circuit 109 working at 16000 Hz, namely, in the state of address=7 in FIG. 3. Subsequently, in synchronism with a subsequent 16000 Hz clock, it loads the value of ø to the register 402 as an initial phase.

At the remaining seven rises of the 16000 Hz clock, the selector 401 adds a value 6250 to the preceding value of the register 402 by use of an adder 403. The value 6250 is one corresponding to the value obtainable by counting, at 100 MHz, one period of the frequency (16000 Hz) fourfold the second harmonic wave 4000 Hz. If the result is 25000 or more, a value obtainable by subtracting 25000 therefrom with modulo (Modulo 25000) 404 is used and it is written into a register 402 by way of the selector 401. By repeating this operation seven times in total, the data corresponding to two periods of the second harmonic are outputted from the sinusoidal wave table of the sinusoidal wave generator 405. Here, since in the generation of a second harmonic wave the sinusoidal wave table is referred to with respect to the date of four points per one period, data for two periods are provided. This is illustrated in FIG. 4B at "ø" and "1/7 TIMES" to "7/7 TIMES". The second harmonic generating circuit 110 multiplies these values by the value of A2 at the multiplier 406, and produces an output.

Generally, in order to reduce table size as much as possible, in many cases, only a portion from zero degree to 90 degrees is provided in the sinusoidal wave table of the sinusoidal wave generator 405, and the remaining portion would be turn down rightwardly/leftwardly and upwardly/downwardly. Referring to FIG. 4B, such method will be as follows.

If the input address range is from zero to 6249, the address after conversion is still unchanged and, while referring to the sinusoidal wave table based on this value, an output is produced.

If the input address range is from 6250 to 12499, the address after conversion is one which is obtainable from "12500 minus address", and, while referring to the sinusoidal wave table based on this value, an output is produced.

If the input address range is from 12500 to 18749, the address after conversion is one which is obtainable from "address minus 12500", and, while referring to the sinusoidal wave table based on this value, an output is produced with the sign being inverted.

If the input address range is from 18750 to 24999, the address after conversion is one which is obtainable from "25000 minus address", and, while referring to the sinusoidal wave table based on this value, an output is produced with the sign being inverted.

It is as a matter of course possible to apply this method of reducing the table size to the fundamental wave generating circuit. Furthermore, in a case where a driving signal presented by an equation including the sum of three or more periodic functions is going to be generated, the aforementioned structure may similarly apply. Namely, in such case, in addition to the fundamental wave generating circuit described hereinabove, two or more harmonic wave generating circuits using a trigonometric function table, similar to the aforementioned second harmonic generating circuit, may be used to constitute a driving signal generating circuit of the drive control unit. Each harmonic generating circuit may be designed as shown in FIG. 4A, taking into account the amplitude and phase supplied from a matrix operating circuit (Mtx) 108 and a predetermined frequency of harmonics to be generated.

The numerical values mentioned above are an example. In dependence of the situation, the system clock and/or the addresses of the trigonometric function table may be increased or decreased.

In accordance with this working example, a driving signal presented by an equation including the sum of a plurality of periodic functions can be generated, by use of a comparatively simple trigonometric function table. Furthermore, an optical deflecting device comprised of an oscillator device having a light source for producing light beam and a plurality of oscillators with a reflecting mirror formed on at least one of the oscillators, is accomplished.

Working Example 2

Figure 5A:
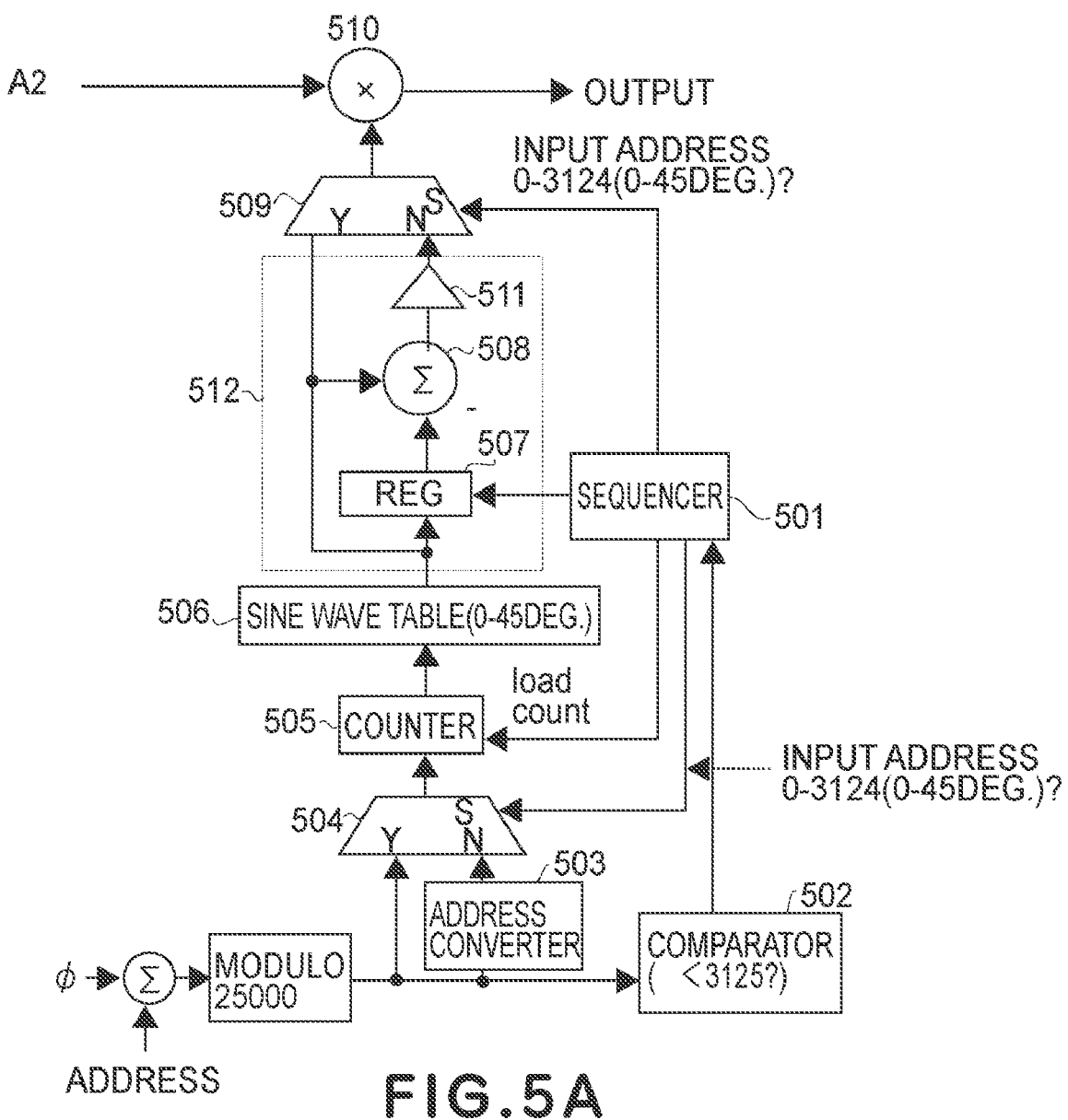
FIG. 5A is a diagram illustrating a structural example of a second harmonic generating circuit of working example 2.

Working example 2 of the present invention will now be explained. The second working example differs from the first working example in the structure of the second harmonic generating circuit 110. The driving signal generating circuit of the drive control unit of the second working example uses a trigonometric function table having a range of 45 degrees and a differentiation circuit, to produce a driving signal. In working example 2 as will be understood from the following description, the size of the sinusoidal wave table of the second harmonic generating circuit can be reduced by a half furthermore. Although the basic structure of the second harmonic generating circuit is the same as that shown in FIG. 4A, the portion around the sinusoidal wave generator 405 is different. FIG. 5A shows the structure. Here, an example wherein the sinusoidal wave table has values from zero to 45 degrees will be explained.

The input addresses have been converted into a range from zero to 6249 (0 to 90 degrees) in accordance with the method described with reference to the second harmonic generating circuit of the first working example, and the sign of the outputs has been inverted as required. The phase ø of the harmonic relative to the fundamental wave can be introduced by using a structure shown in the lower left part of FIG. 5A. This structure is basically the same as that of the working example 1.

The conversion of input address is carried out as follows.
If the input address range is from zero to 3124, the address after conversion is still unchanged and, while referring to the sinusoidal wave table based on this value, an output is produced.

If the input address range is from 3125 to 6249, the address after conversion is one which is obtainable from "6249 minus address" and, by differentiating the value of a sinusoidal wave corresponding to this value, an output is produced. Here, the value provided by "6249 minus input address" is one obtainable by turning down the address from 3124 to zero.

The operation will now be explained with reference to FIG. 5.

The input address in the range of zero to 6249 (0 to 90 degrees) undergoes discrimination at a comparator 502 with regard to whether input address is in the range of zero to 3124 (not less than zero and not greater than 45 degrees). The sequencer 501 discriminates based on the output of the comparator 502 whether (i) the input address is from zero to 3124 or (2) the input address is from 3125 to 6249.

(1) The input address is 0 to 3124:

In both of the selectors 504 and 509, a Y input has already been selected. With regard to the output of the selector 504, since the input address is directly outputted without unchanged, the input address is loaded to the counter 505 and the input Y of the selector 509 is connected to the output of the sinusoidal wave table 506. Subsequently, the output of the selector 509 is multiplied by the coefficient A2 at the multiplier 510, and an output is produced.

(2) The input address is 3125 to 6249:

In both of the selectors 504 and 509, an N input has already been selected. First of all, the input address is converted at the address converter 503, as follows.

Output=6249 minus input addresses

Figure 5B:
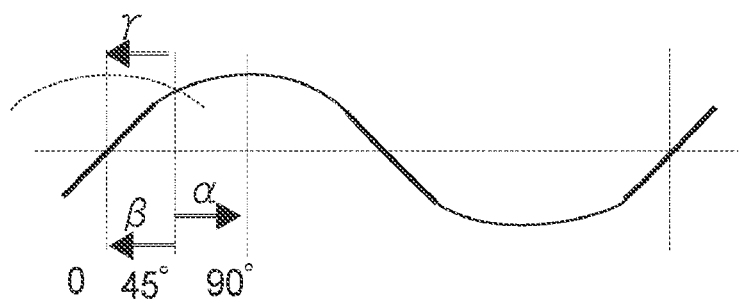
FIG. 5B is a diagram illustrating a sinusoidal wave table of it.

This means that the region α shown in FIG. 5B is converted into the region β. Subsequently, the sequencer 501 loads the output of the selector 504 to the counter 505.

Next, the differentiating circuit 512 for differentiating the value of the sinusoidal wave and producing an output will be explained. The differentiating circuit 512 is comprised of a register 507, an adder 508 and a coefficient multiplier 511.

The sequencer 501 latches the output of the sinusoidal wave table 506 on the register 507 and, simultaneously therewith, it counts up (add up) the counter 505.

The adder 508 subsequently produces an output corresponding to the difference between the value latched on the register 507 and the added-up value, namely, one increment angle ($2\pi/25000$ in this example). More specifically, since one period (0 to 360 degrees) is divided into 25000, $$\sin(2\pi x/25000) - \sin(2\pi(x+1)/25000)$$

is obtained. To normalize this by $\Delta x = 2\pi/25000$, it is multiplied by $25000/(2\pi)$ at the coefficient multiplier 511. As a result of this, a cosine is provided from the sine at the differentiating circuit and, from the value of β shown in FIG. 5B, the value of γ is provided. Thereafter, like the case of (1), the output of the selector 509 is multiplied by the coefficient A2 at the multiplier 510, and an output is produced.

Although the input address to the sinusoidal wave table 506 has been converted into a range from zero to not greater than 45 degrees, the sinusoidal wave table should have a range from zero just up to 45 degrees, inclusive. Otherwise, the address would jut out of the sinusoidal wave table at the moment as the counter is added up. Furthermore, although the foregoing description has been made with reference to an example wherein a sinusoidal wave table having a range of zero to 45 degrees is used, since the relationship in which the differentiation of a sine provides a cosine applies in a range from zero to 360 degrees, any other arbitrary region of 45 degrees may be used. However, if zero to 45 degrees is obtained from a sinusoidal wave table of 45 degrees to 90 degrees on the basis of difference normalization, the difference value becomes smaller. This causes an increase of error when an actual circuit having a finite precision is used, even though there is no difference in the mathematic sense.

It is as a matter possible to apply the method used in the second harmonic generating circuit to the fundamental wave generating circuit. Obviously in that case, the phase ø is not introduced. The remaining points are similar to working example 1, and advantageous results similar to those described with reference to working example 1 are accomplished. Particularly, with use of this working example, the size of the chopping wave table can be reduced furthermore.

Working Example 3

Working example 3 of the present invention will be explained below. The third working example differs from the first working example in the structure of the second harmonic generating circuit 110. The driving signal generating circuit of the drive control unit of the third working example uses a trigonometric function table having an increment precision corresponding to 1/n of a required angular resolution where n is an integer, and an interpolation circuit, to produce a driving signal. Thus, in working example 3, the size of the sinusoidal wave table can be reduced furthermore. In this method, the number of the components of the sinusoidal wave table may be reduced beforehand to a half, for example. If the sinusoidal wave table is such as shown in FIG. 4C, only the values of even addresses may be used. When an odd address is inputted, an average of upper and lower even addresses of the same may be used to obtain an approximate value. It should be noted that, with regard to the structure of the second harmonic generating circuit of the this working example shown in FIG. 6, the phase ø of the harmonic relative to the fundamental wave is being introduced by a structure as shown in the lower left part of FIG. 5A, although it is not illustrated in FIG. 6.

Figure 6:
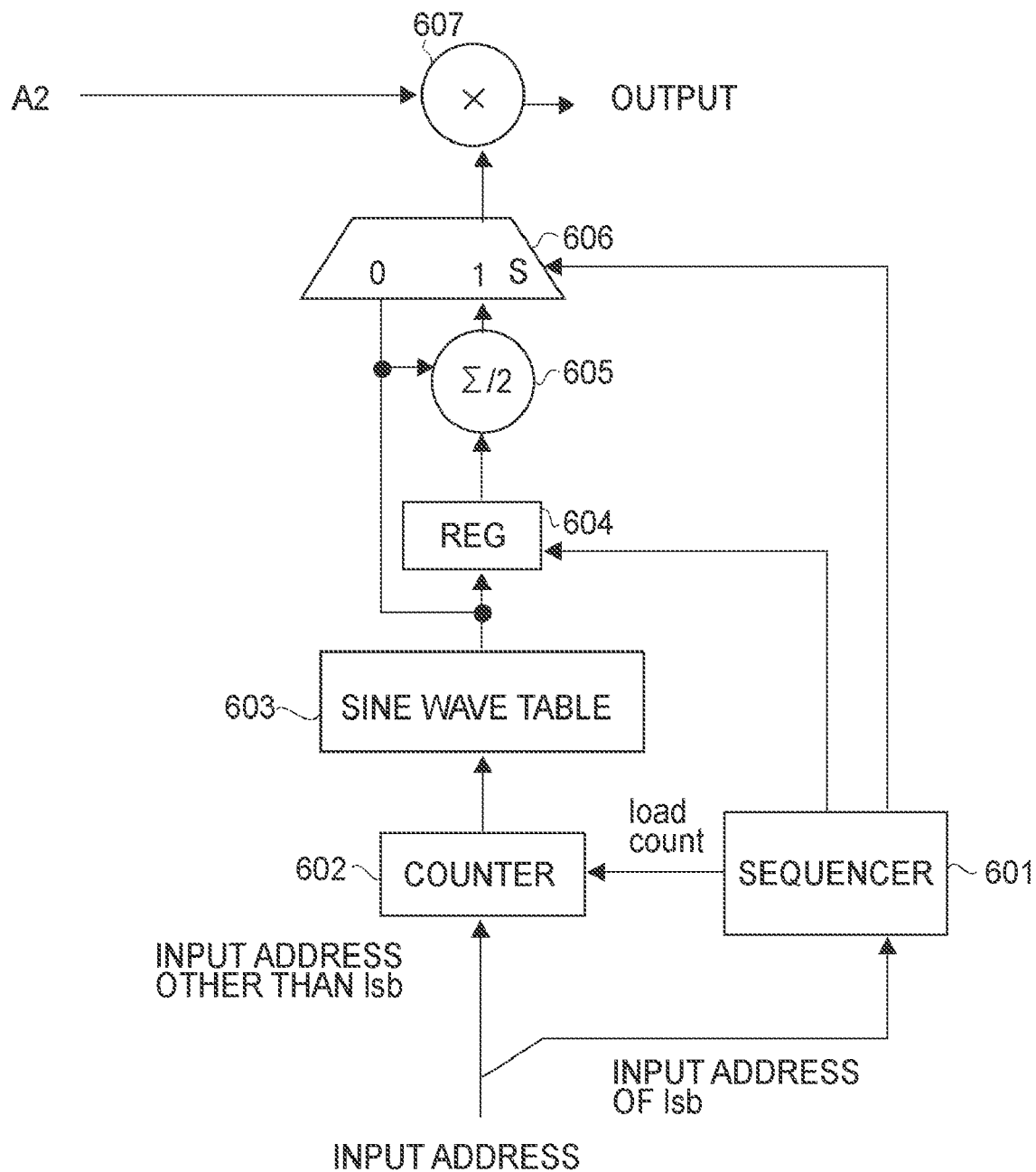
FIG. 6 is a diagram illustrating a structural example of a second harmonic generating circuit of working example 3.

The operation of this working example will be explained with reference to FIG. 6.

(1) The Input Address is an Even Number (lsb (Least Significant Bit)=0):

Since the lsb of the input address is 0 and it is an even number, the sequencer 601 loads a value, other than the lsb of the input address, to the counter 602 and connects the input 0 of the selector 606 to the output of the sinusoidal wave table 603. Afterwards, the output of the selector 606 is multiplied by the coefficient A2 at the multiplier 607, and an output is produced.

(2) The Input Address is an Odd Number (lsb=1):

Since the lsb of the input address is 1 and it is an odd number, the sequencer 601 loads a value, other than the lsb of the input address, to the counter 602. As a result, an even address which is lower than one from the value of the desired odd address is set. Subsequently, the value of the sinusoidal wave table 603 is latched on the register 604 and, simultaneously therewith, the counter 602 is counted up. By this, an even address which is higher by one than the value of the desired odd address is set at the output of the counter 602.

Hence, at the output of the averaging circuit 605, a mean value of the sinusoidal wave table between the higher and lower even addresses of the desired odd address, is obtained. Thus, the input 1 of the selector 606 is connected to the output of the sinusoidal wave table 603. After this, the output of the selector 606 is multiplied by the coefficient A2 at the multiplier 607, and an output is produced.

The above structural example of the third working example may be used in combination with the structural example of the first and/or second working examples. Particularly, if it is used in combination with the second working example, the size of the chopping wave table can be reduced considerably. Furthermore, in this working example as well, the method used in this second harmonic generating circuit can be applied to the fundamental wave generating circuit. In this working example as well, the remaining points are similar to the first working example, and advantageous results is similar to those of the first working example are accomplished.

Working Example 4

Working example 4 of the present invention will be explained below. In the fourth working example, the driving signal generating circuit of the drive control unit generates a driving signal by further using a PWM (Pulse Width Modulation) driving circuit. The PWM driving circuit of the oscillation system 115 of this working example will be explained in detail.

Figure 7A:
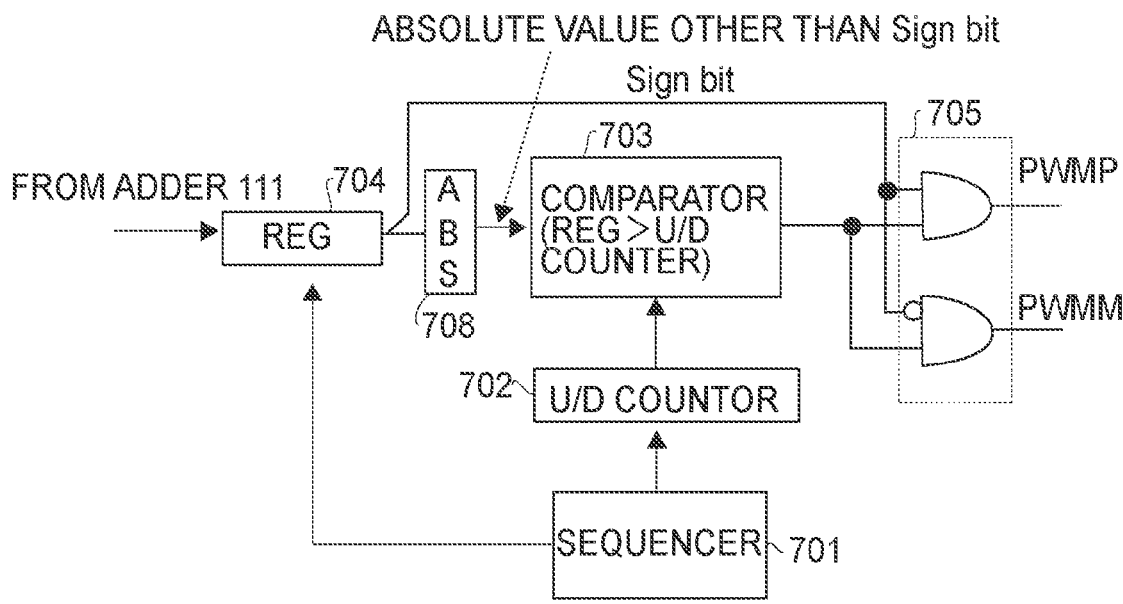
FIG. 7A is a diagram illustrating a structural example of a PWM (pulse width modulation) driving circuit of working example 4.
Figure 8:
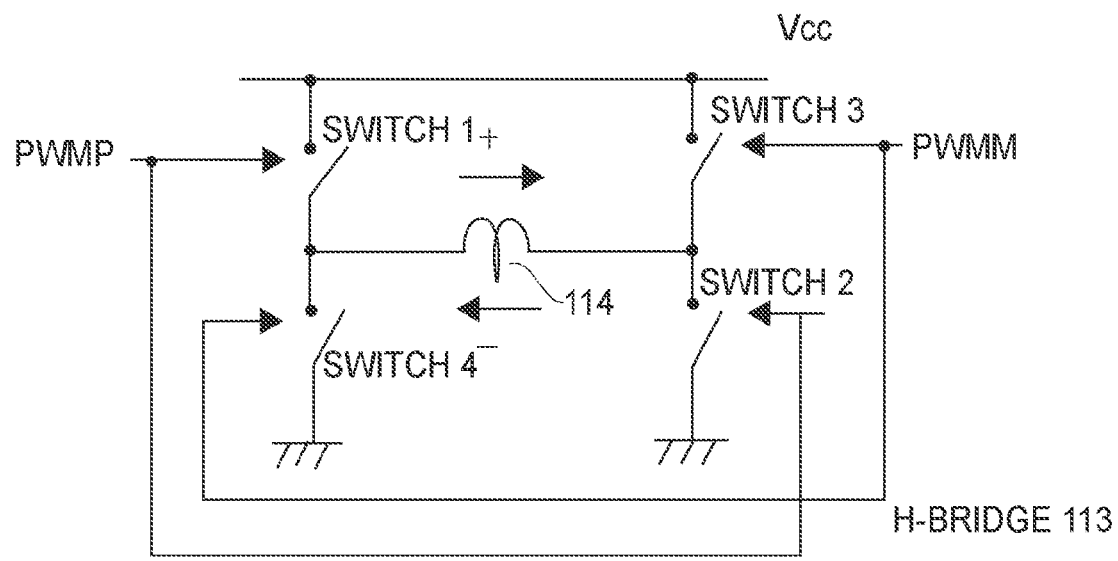
FIG. 8 is a diagram illustrating an H-bridge circuit of working example 4.

The outputs of the fundamental wave generating circuit 109 and the second harmonic generating circuit 110 having been described with reference to the preceding working examples are added each other by an adder 111 in FIG. 1, and an output therefrom is applied to the PWM driving circuit 112 of the working example as shown in FIG. 7A. In this working example, since a sinusoidal wave is generated every unit time corresponding to octa-section of 50000 Hz, this unit time is called a "slot". Thus, the system clock of 100 MHz is 6250 clocks per a single slot. Considering cases from one wherein zero pulse is outputted during this duration up to one wherein 6250 pulses are outputted during that duration, it is about 13.5 bit. However, in order to avoid phase drift in dependence upon the output value from the adder 111, the pulse number should be controlled so that it expands bilaterally symmetrically from the center of each slot. To this end, pulses of an even number should be driven constantly and, therefore, the resolution would be a half of that described above. On the other hand, an H-bridge circuit (H-bridge) 113 at a subsequent stage as shown in FIG. 8 in detail is able to perform electric drive in both of positive and negative directions with respect to a driving coil 114. Therefore, a double resolving power is obtainable. Hence, about 13.5 bit is attainable as a result.

Referring to FIG. 7, the operation of the PWM drive circuit will be explained.

Figure 7B:
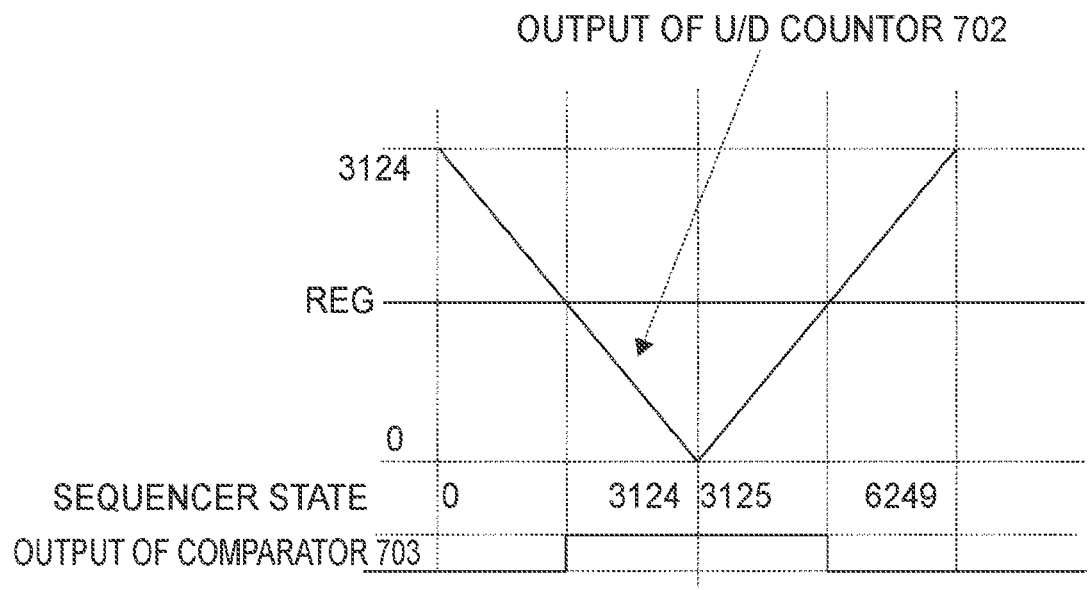
FIG. 7B is a diagram illustrating a PWM driving waveform.

When the sequencer state reaches 6249 at the last slot, the sequencer 701 latches the data (signed number) of the adder 111 on a register 704. On the other hand, as shown in FIG. 7B, within the duration of the slot, the output of an up/down counter (U/D Counter) 702 changes from 3124 to zero and then from zero to 3124, this being repeated.

The output of the register 704 through an absolute value circuit 708 (an absolute value of a number other than the sign bit of the signed number) as well as the output of the up/down counter 702 are inputted into a comparator 703. In the comparator 703, if REG>U/D counter, the output of the comparator 703 is 1 as shown in FIG. 7B. If not so, the output of the comparator 703 is zero as shown in FIG. 7B. Here, in each slot, the output (REG) of the register 704 via an absolute value circuit 708 rises or falls relative to the output of the up/down counter (U/D Counter) 702. Hence, the output of 1 of the comparator 703 is produced while the width thereof is being changed laterally symmetrically with respect to the center of each slot. This output is applied to an output gate 705 shown in FIG. 7A.

At this output gate 705, the output of 1 of each slot provides a PWMP signal to be connected to the plus (positive) side of the H-bridge circuit 113 shown in FIG. 8 or a PWMM signal to be connected to the minus (negative) side thereof, in accordance with the sign bit held by the register 704. In this manner, at each slot, during a period in which the output is 1, the driving coil 114 is excited. If the signal is connected to the plus side (PWMP), Switch 1 and Switch 2 shown in FIG. 8 are closed so that a plus (+) current is applied to the driving coil 114. If the signal is connected to the minus side (PWMM), Switch 3 and Switch 4 are closed and a minus (−) current is applied to the driving coil 114. As described above, a pulse signal is generated in accordance with the signal in the form of the sum of periodic functions from the adder 111, and the driving coil 114 of the driving member is driven by this pulse driving signal.

The remaining points are similar to those of the first working example, and advantageous results similar to the first working example are accomplished.

Working Example 5

Figure 10:
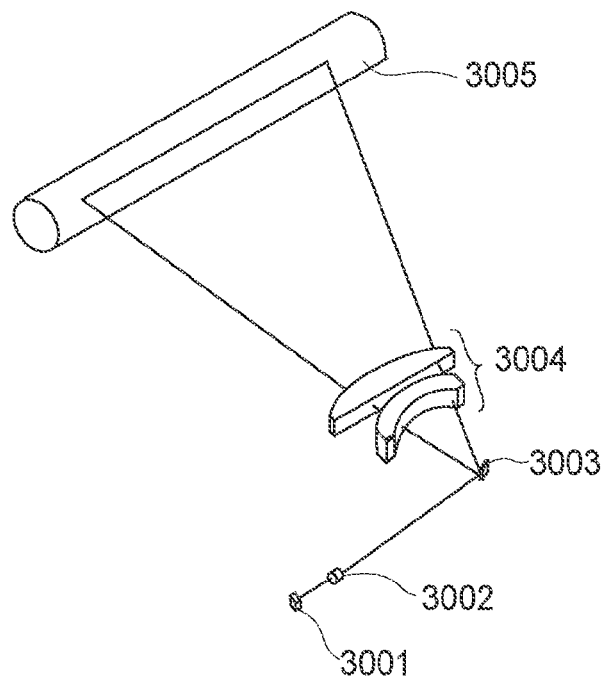
FIG. 10 is a perspective view which shows an embodiment of an optical instrument using an optical deflecting device according to the present invention.

FIG. 10 is a schematic perspective diagram which shows a working example of an optical instrument using an optical deflecting device of the present invention. Here, an image forming apparatus is illustrated as the optical instrument. In FIG. 10, denoted at 3003 is an optical deflecting device of the present invention. In this working example, the incident light is scanned one-dimensionally. Denoted at 3001 is a laser source, and denoted at 3002 is a lens or lens group. Denoted at 3004 a writing lens or lens group, and denoted at 3005 is a drum-shaped photosensitive member.

The laser beam emitted from the laser source 3001 undergoes predetermined intensity modulation related to the timing of scanning deflection of the light. The intensity-modulated light goes along the lens or lens group 3002, and it is scanned one-dimensionally by means of an optical scanning system (optical deflecting device) 3003. The thus scanned laser beam forms an image on the photosensitive member 3005 through the writing lens or lens group 3004.

The photosensitive member 3005 is rotated in a direction perpendicular to the scan direction and around a rotation axis, and it is uniformly electrostatically charged by means of a charging device (not shown). By scanning the photosensitive member with the light, an electrostatic latent image is formed on the scanned portion. Subsequently, by means of a developing device (not shown), a toner image is formed at the electrostatic latent image portion. By transferring the toner image to a transfer sheet (not shown), for example, and by fixing the same, an image is produced on the sheet.

When an optical deflecting device of the present invention is used, the oscillator can be oscillated by a driving signal presented by an equation including the sum of a plurality of periodic functions and by use of a trigonometric function table. Thus, an image forming apparatus having an optical deflecting device in which an oscillation system moving in a mode having components of two resonance frequencies, for example, is controlled as desired, can be realized. In this way, an optical deflecting device well adjusted in a desired operational state is assured. Since it can be driven with high amplitude amplification factor, the size can be made small and the power consumption can be made low. Furthermore, the angular speed of the scanning deflection of the light on the photosensitive member 3005 can be made approximately constant within the range of specifications. Moreover, when an optical deflecting device of the present invention is used, the optical scanning characteristic is improved and an image forming apparatus being able to produce a sharp image is accomplished.

An optical deflecting device of the present invention which is comprised of an oscillator device as described above, having a light source for producing a light beam and an optical deflection device for deflecting the light beam and provided on an oscillator, is applicable also to a visual display unit. As an example, the visual display unit may include a visual display member, and the optical deflecting device deflects the light from the light source. At least a portion of the light from the light source is projected onto the visual display member.

While the invention has been described with reference to the structures disclosed herein, it is not confined to the details set forth and this application is intended to cover such modifications or changes as may come within the purposes of the improvements or the scope of the following claims.

This application claims priority from Japanese Patent Application No. 2007-131353 filed May 17, 2007, for which is hereby incorporated by reference.

What is claimed is:

1. An oscillator device with a plurality of oscillators and a plurality of torsion springs, comprising:
    an oscillation system having a first oscillator, a second oscillator, a first torsion spring configured to connect said first oscillator and said second oscillator to each other, and a second torsion spring connected to said second oscillator and having a torsion axis consistent with a torsion axis of said first torsion spring;
    a supporting member configured to support said oscillation system;
    a driving member configured to drive said oscillation system so that at least one of said first oscillator and said second oscillator produces oscillation being expressed by an equation containing a sum of a plurality of periodic functions;
    a signal output device configured to produce an output signal in accordance with displacement of at least one of said first oscillator and said second oscillator; and
    a drive control unit configured to control said driving member based on the output signal of said signal output device and by use of a driving signal so that at least one of an amplitude and a phase of the plurality of periodic functions acquires a predetermined value;
    wherein the driving signal is expressed by an equation containing a sum of a plurality of periodic functions corresponding to the first-mentioned plurality of periodic functions, respectively,
    wherein said drive control unit includes a driving signal generating circuit configured to generate the driving signal based on a trigonometric function table,
    wherein said oscillation system is configured to simultaneously produce a first vibrational motion moving with a first frequency which is a fundamental frequency and a second vibrational motion moving with a second frequency which is a frequency integer-fold the fundamental frequency,
    wherein said driving member is configured to apply a first periodic driving force having the first frequency and a second periodic driving force having the second frequency,
    wherein the output signal of said signal output device contains first and second, different time entries whereat at least one of said first oscillator and said second oscillator takes a first displacement angle and third and fourth, different time entries whereat said at least one oscillator takes a second displacement angle, and
    wherein said drive control unit controls said driving member based on the four, first to fourth time entries thereby to control oscillation of at least one of said first oscillator and said second oscillator defined by an amplitude and a relative phase difference of said first vibrational motion and said second vibrational motion.

2. An oscillator device according to claim 1, wherein, when A1 and A2 each denotes an amplitude, ø denotes a relative phase difference, ω denotes an angular frequency, and t denotes time, said drive control unit controls said driving member to drive said oscillation system so that displacement of at least one of said first oscillator and said second oscillator provides oscillation being expressed by an equation which contains at least a term of A1 sin ωt+A2 sin(nωt+ø) where n is an integer not less than 2.

3. An oscillator device according to claim 1, wherein said driving signal generating circuit of said drive control unit is configured to generate the driving signal by use of a pulse width modulation driving circuit.

4. An optical deflector, comprising:
    a light source configured to emit a light beam; and
    an oscillator device as recited in claim 1 and having a reflection mirror formed on at least one of said first oscillator and said second oscillator.

5. An image forming apparatus, comprising:
    an optical deflector as recited in claim 4; and
    a photosensitive member;
    wherein said optical deflector is configured to deflect light from said light source and to direct at least a portion of the light onto said photosensitive member.

6. A visual display apparatus, comprising:
    an optical deflector as recited in claim 4; and
    a visual display member;
    wherein said optical deflector is configured to deflect light from said light source and to direct at least a portion of the light onto said visual display member.

7. An oscillator device with a plurality of oscillators and a plurality of torsion springs, comprising:
    an oscillation system having a first oscillator, a second oscillator, a first torsion spring configured to connect said first oscillator and said second oscillator to each other, and a second torsion spring connected to said second oscillator and having a torsion axis consistent with a torsion axis of said first torsion spring;
    a supporting member configured to support said oscillation system;
    a driving member configured to drive said oscillation system so that at least one of said first oscillator and said second oscillator produces oscillation being expressed by an equation containing a sum of a plurality of periodic functions;
    a signal output device configured to produce an output signal in accordance with displacement of at least one of said first oscillator and said second oscillator; and
    a drive control unit configured to control said driving member based on the output signal of said signal output device and by use of a driving signal so that at least one of an amplitude and a phase of the plurality of periodic functions acquires a predetermined value;
    wherein the driving signal is expressed by an equation containing a sum of a plurality of periodic functions corresponding to the first-mentioned plurality of periodic functions, respectively,
    wherein said drive control unit includes a driving signal generating circuit configured to generate the driving signal based on a trigonometric function table, and
    wherein said driving signal generating circuit of said drive control unit is configured to generate the driving signal by use of a trigonometric function table having a range of 45 degrees and a differentiation circuit.

8. An oscillator device with a plurality of oscillators and a plurality of torsion springs, comprising:
    an oscillation system having a first oscillator, a second oscillator, a first torsion spring configured to connect said first oscillator and said second oscillator to each other, and a second torsion spring connected to said second oscillator and having a torsion axis consistent with a torsion axis of said first torsion spring;
    a supporting member configured to support said oscillation system;
    a driving member configured to drive said oscillation system so that at least one of said first oscillator and said second oscillator produces oscillation being expressed by an equation containing a sum of a plurality of periodic functions;

a signal output device configured to produce an output signal in accordance with displacement of at least one of said first oscillator and said second oscillator; and a drive control unit configured to control said driving member based on the output signal of said signal output device and by use of a driving signal so that at least one of an amplitude and a phase of the plurality of periodic functions acquires a predetermined value;

wherein the driving signal is expressed by an equation containing a sum of a plurality of periodic functions corresponding to the first-mentioned plurality of periodic functions, respectively, wherein said drive control unit includes a driving signal generating circuit configured to generate the driving signal based on a trigonometric function table, and wherein said driving signal generating circuit of said drive control unit is configured to generate the driving signal by use of a trigonometric function table having an increment precision corresponding to 1/n of a required angular resolution where n is an integer, and an interpolation circuit.

9. In a driving signal generating method that generates a driving signal in an oscillator device having an oscillation system including a plurality of oscillators and a plurality of torsion springs, a driving member configured to drive the oscillation system and a drive control unit configured to control the driving member based on a driving signal, the improvements comprising:

the driving signal being expressed by an equation containing a sum of a plurality of periodic functions; and the driving signal being generated by use of a trigonometric function table, wherein the trigonometric function table is a trigonometric function table having a range of 45 degrees, and wherein the driving signal is generated by use of the trigonometric function table and a differentiation circuit.

* * * * *